E. LAMBERT AND R. PERNIN.
MECHANICAL PROCESS OF WEAVING.
APPLICATION FILED MAY 21, 1920.

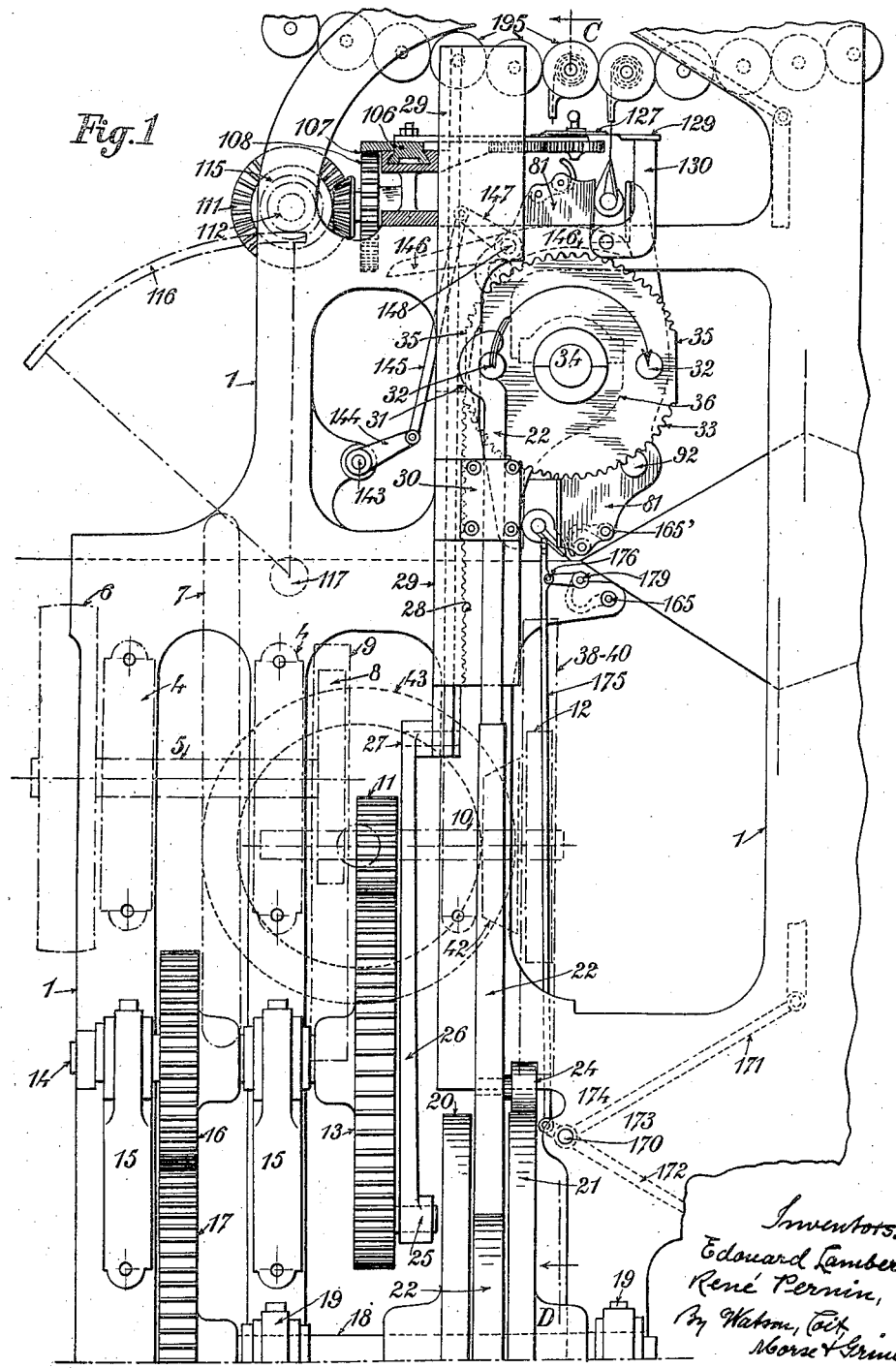

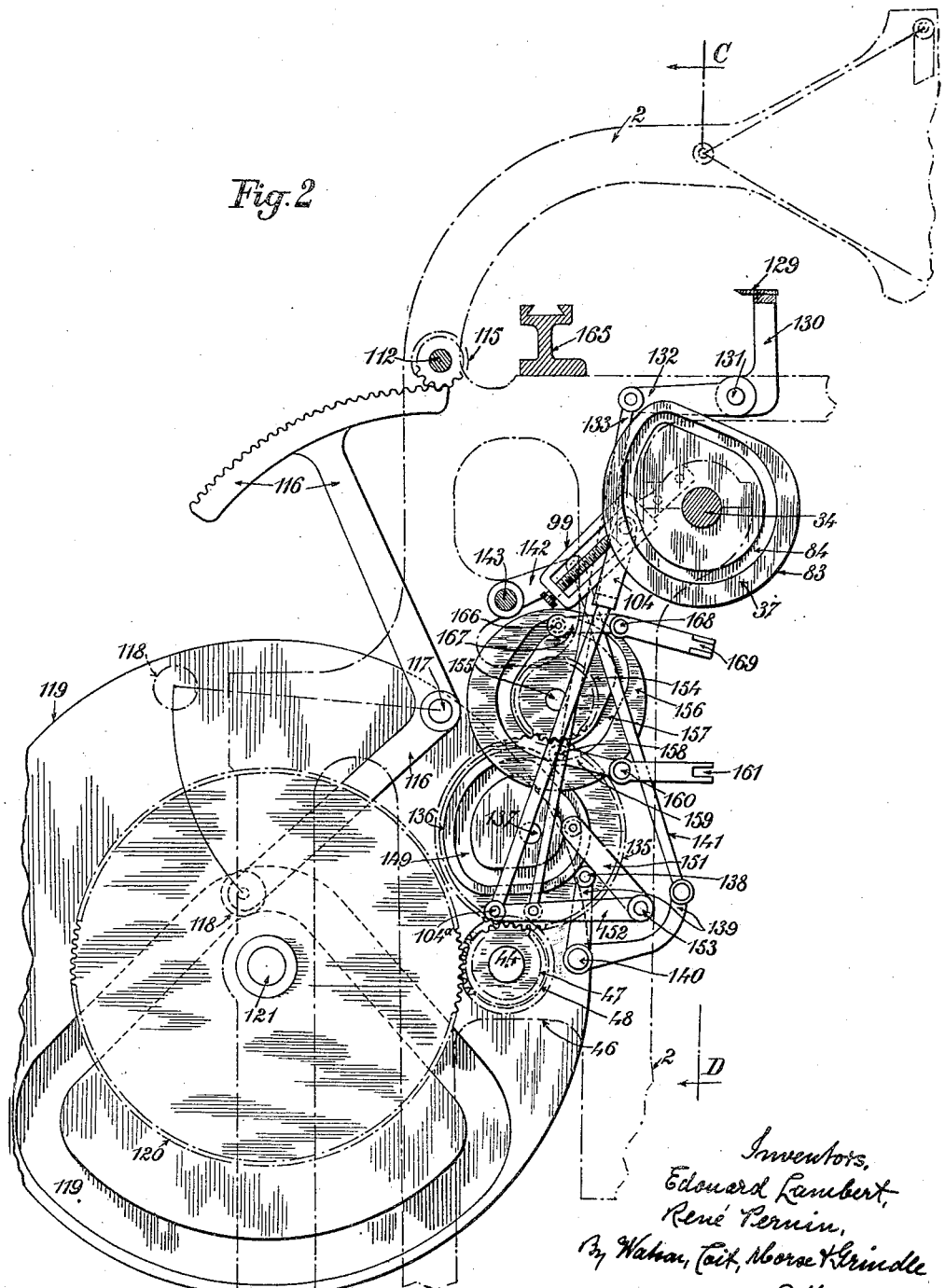

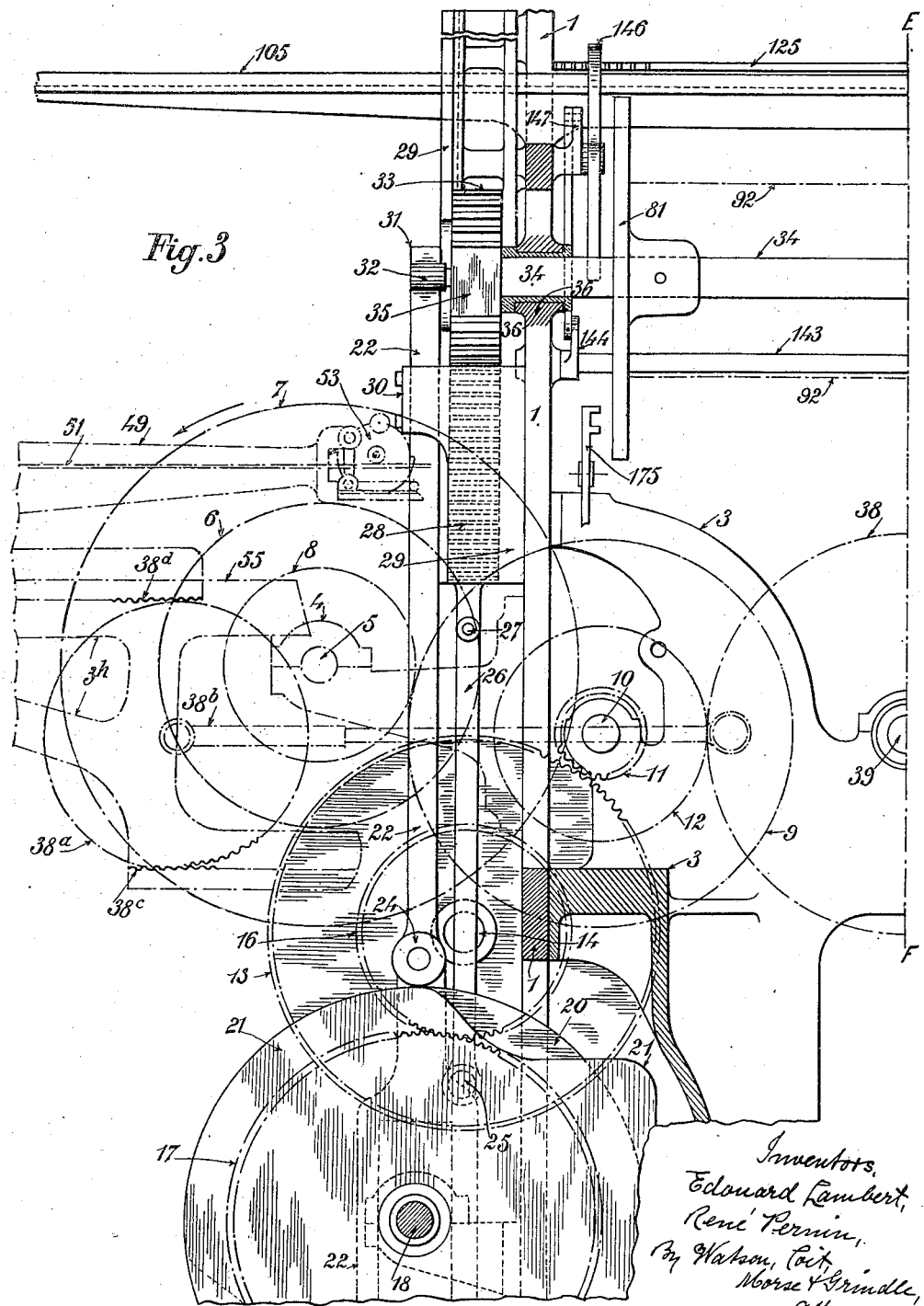

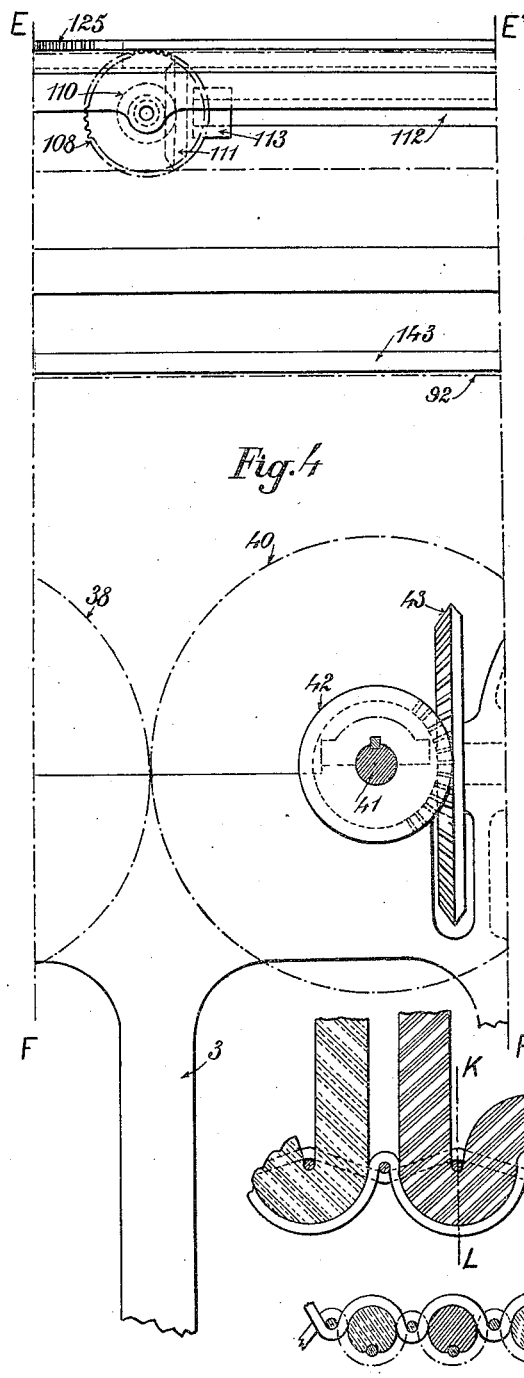
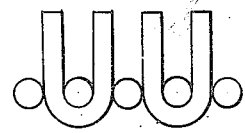
Fig. 33
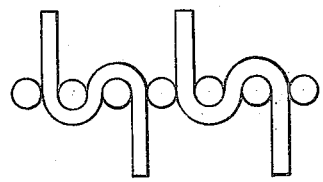
Fig. 34
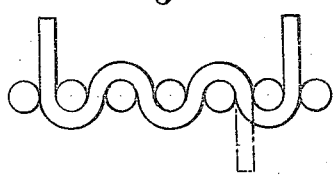
Fig. 35
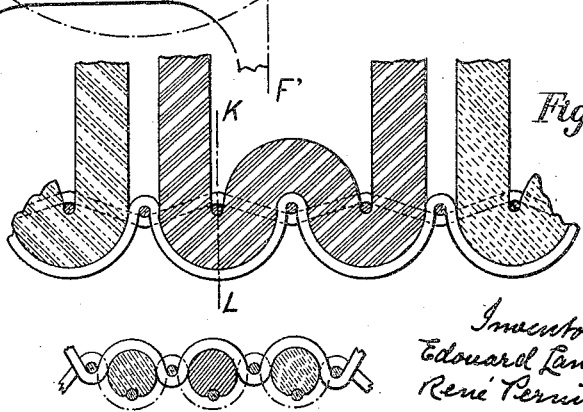

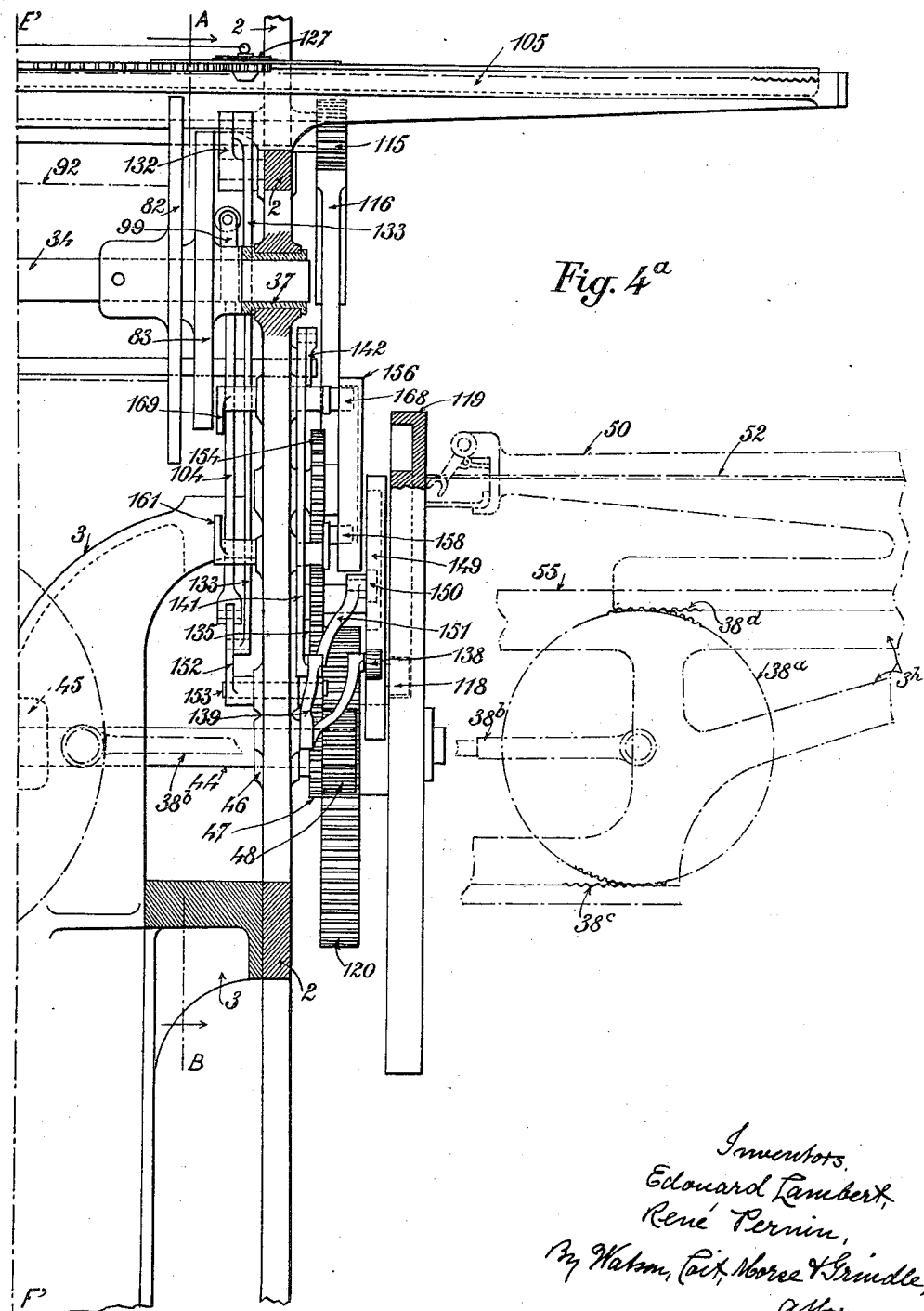

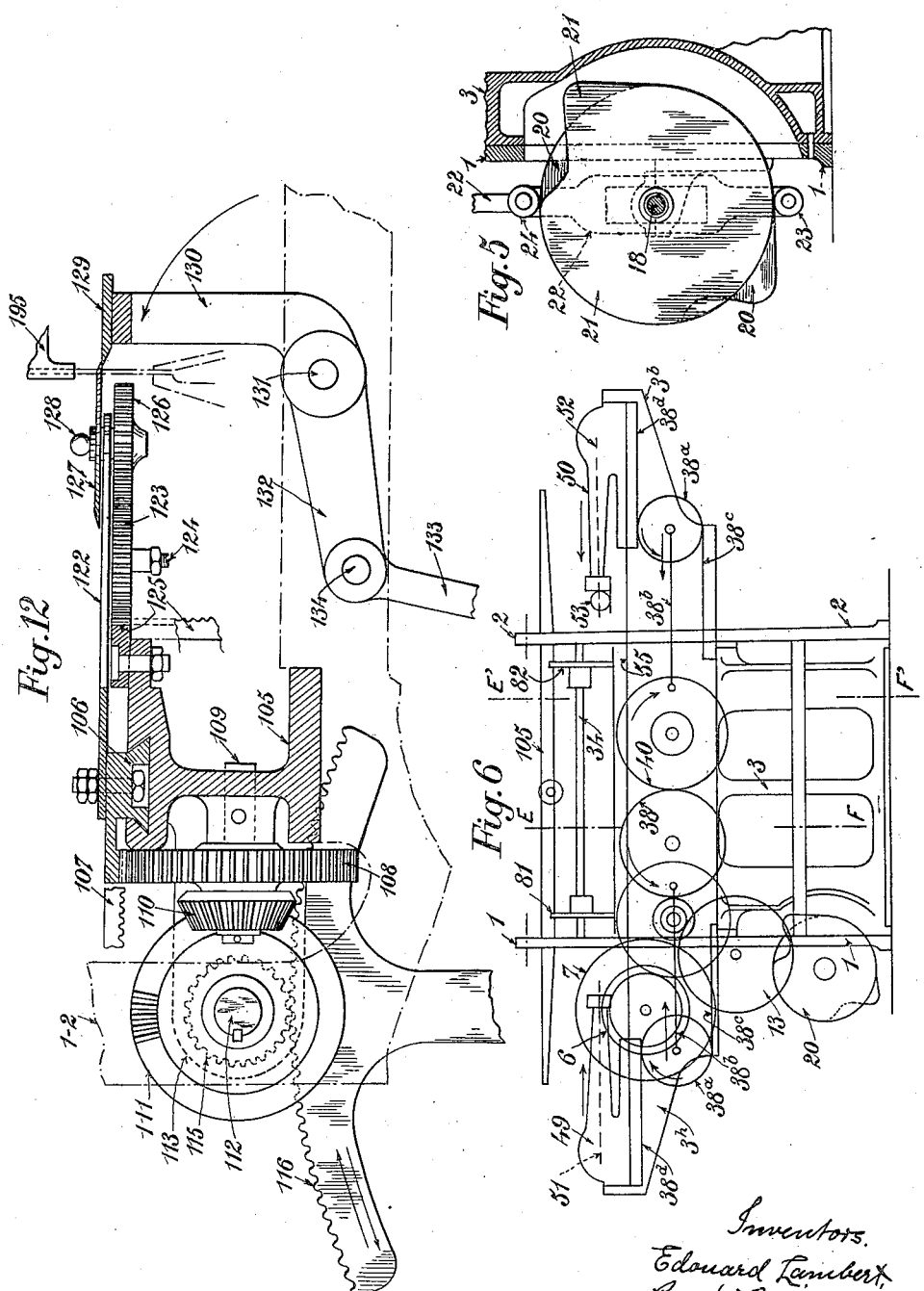

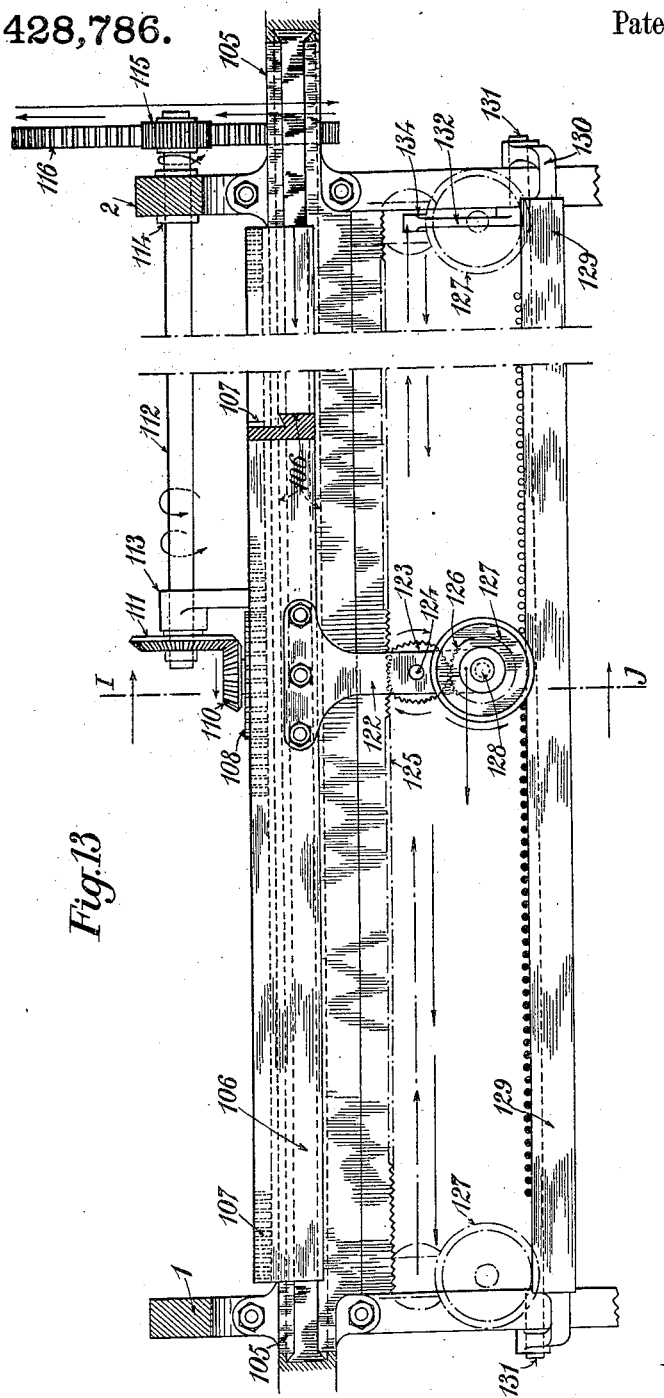

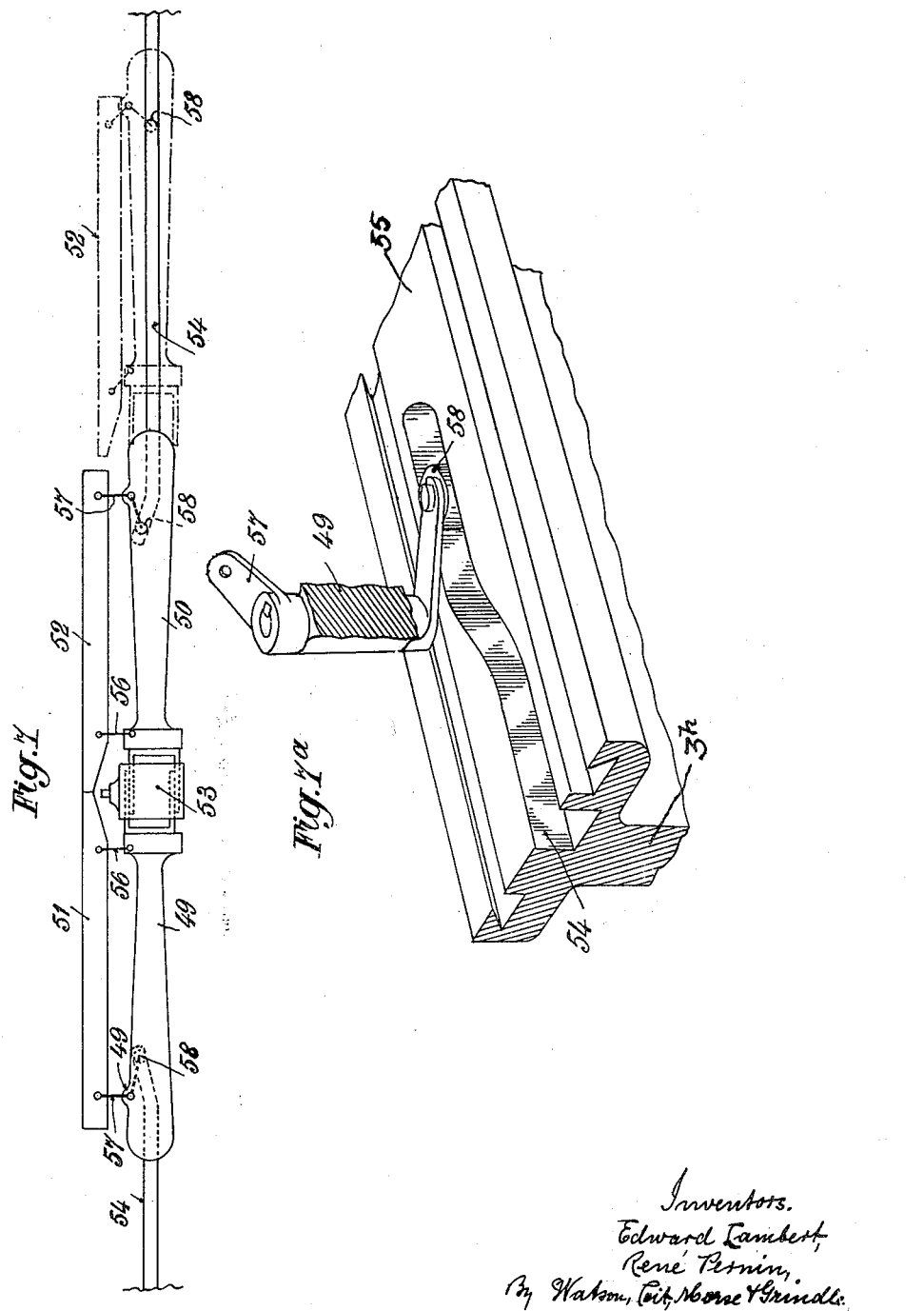

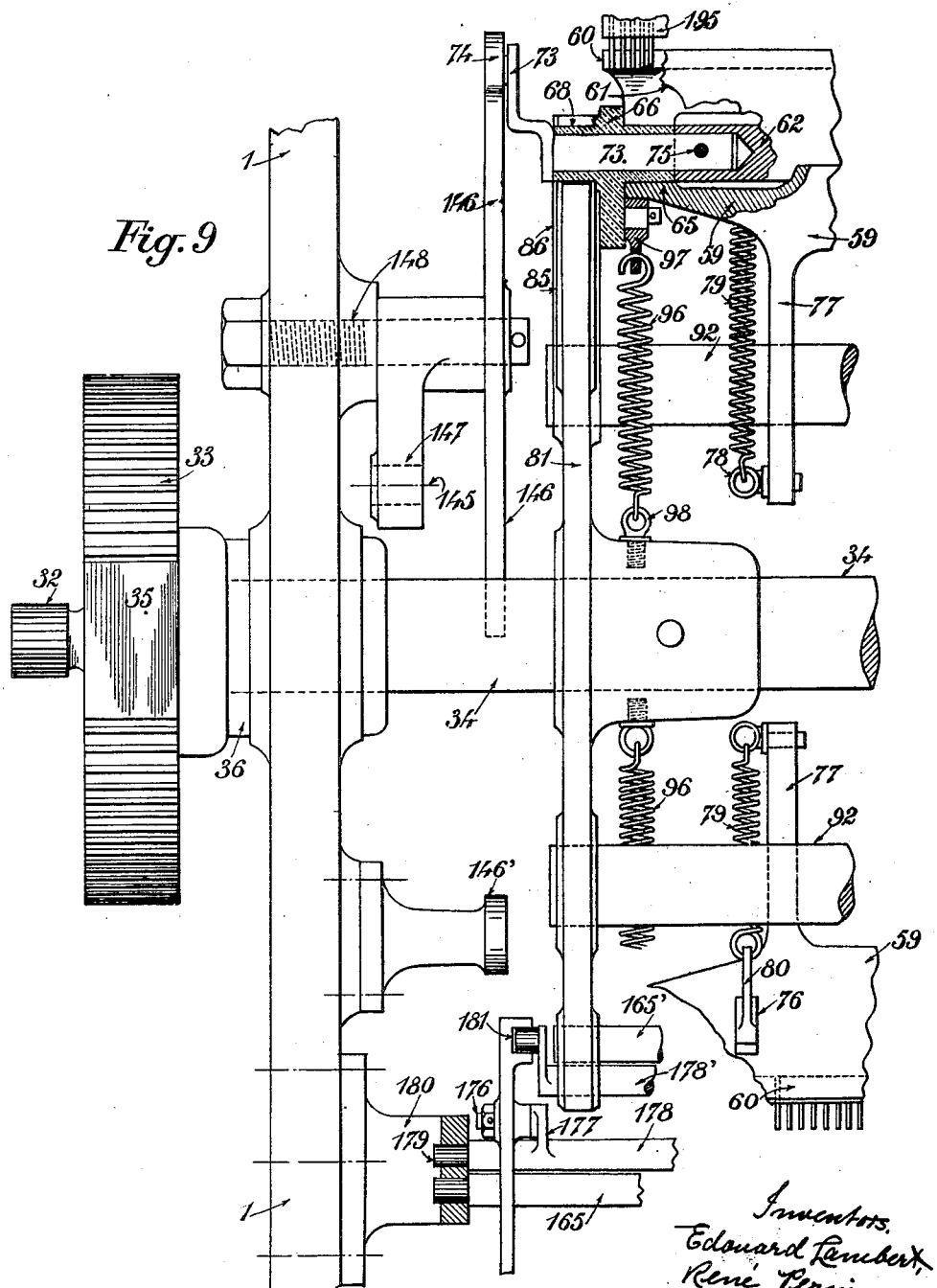

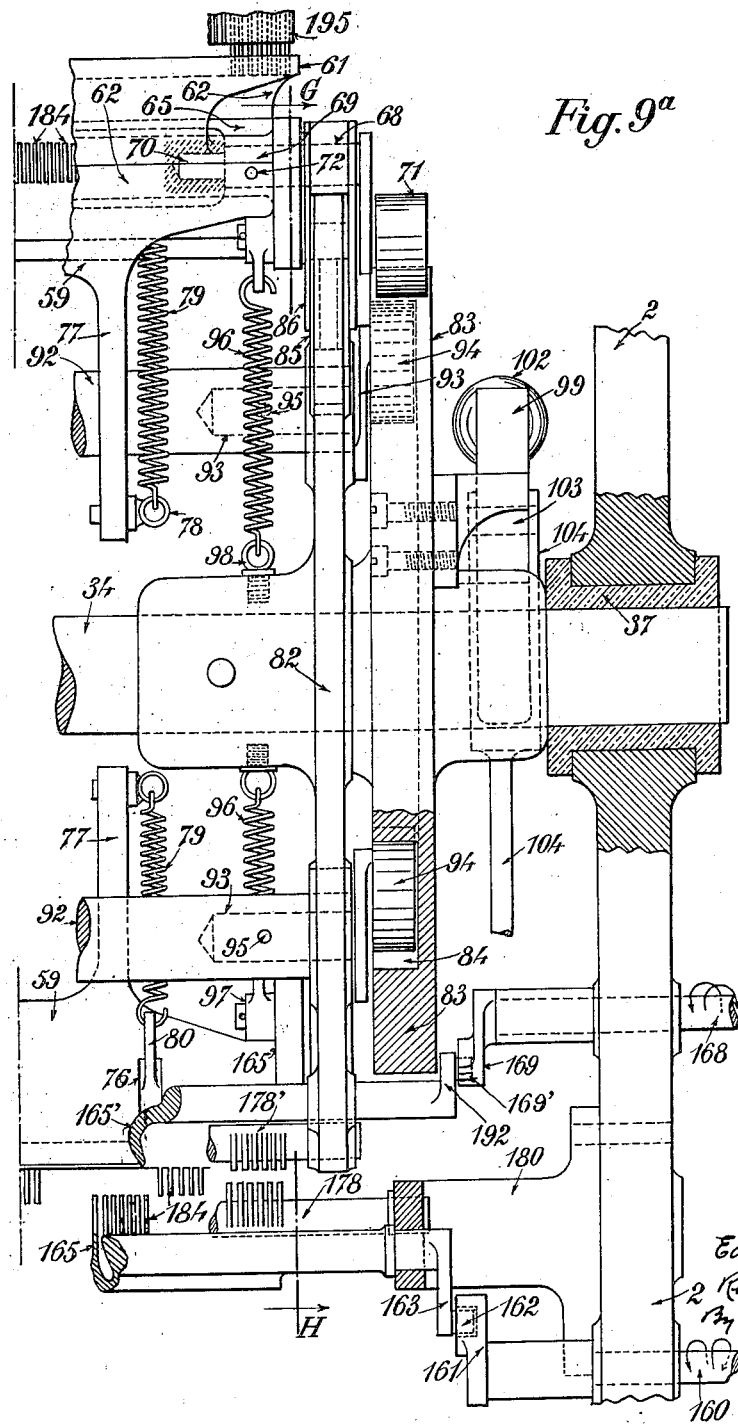

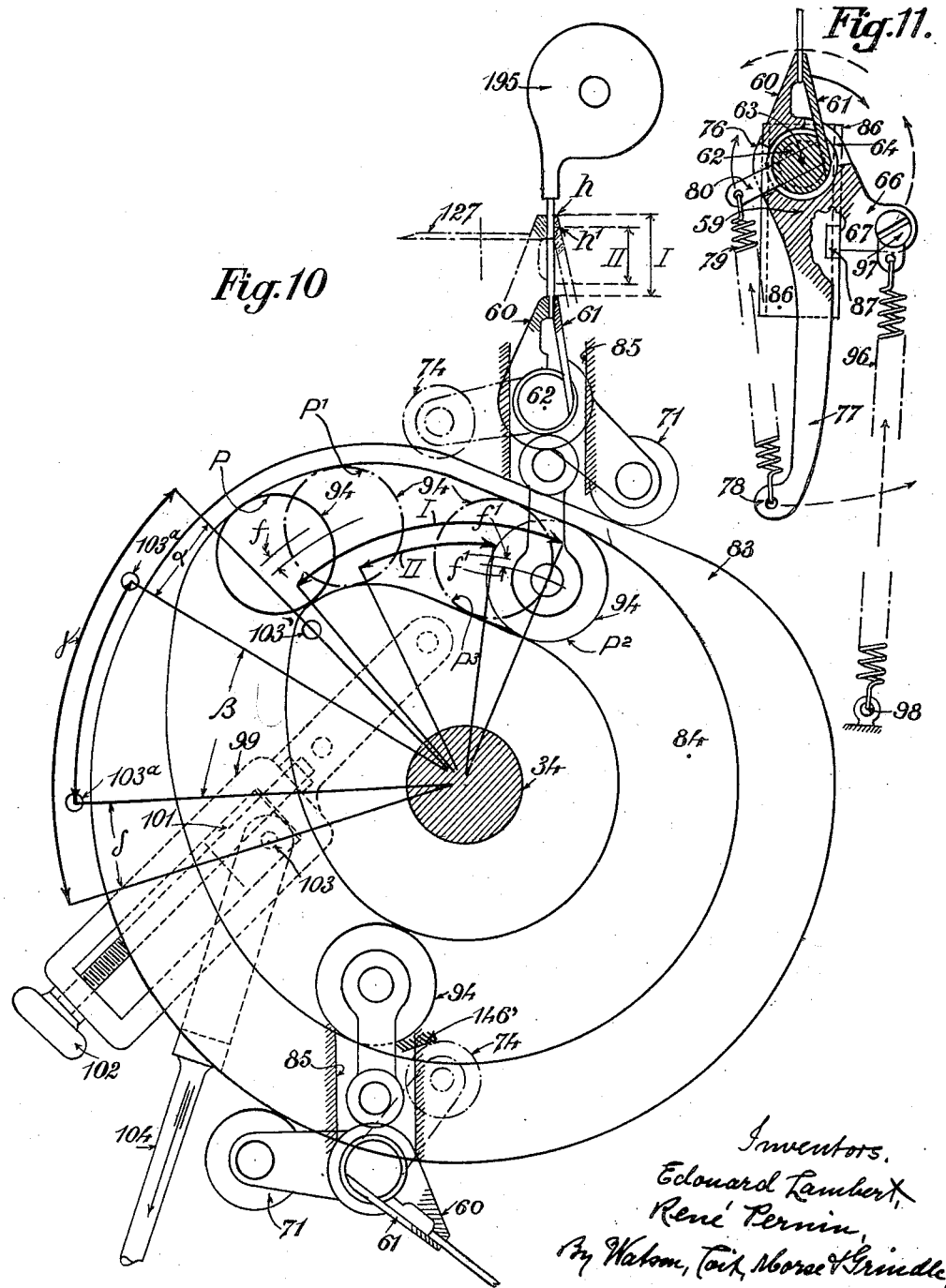

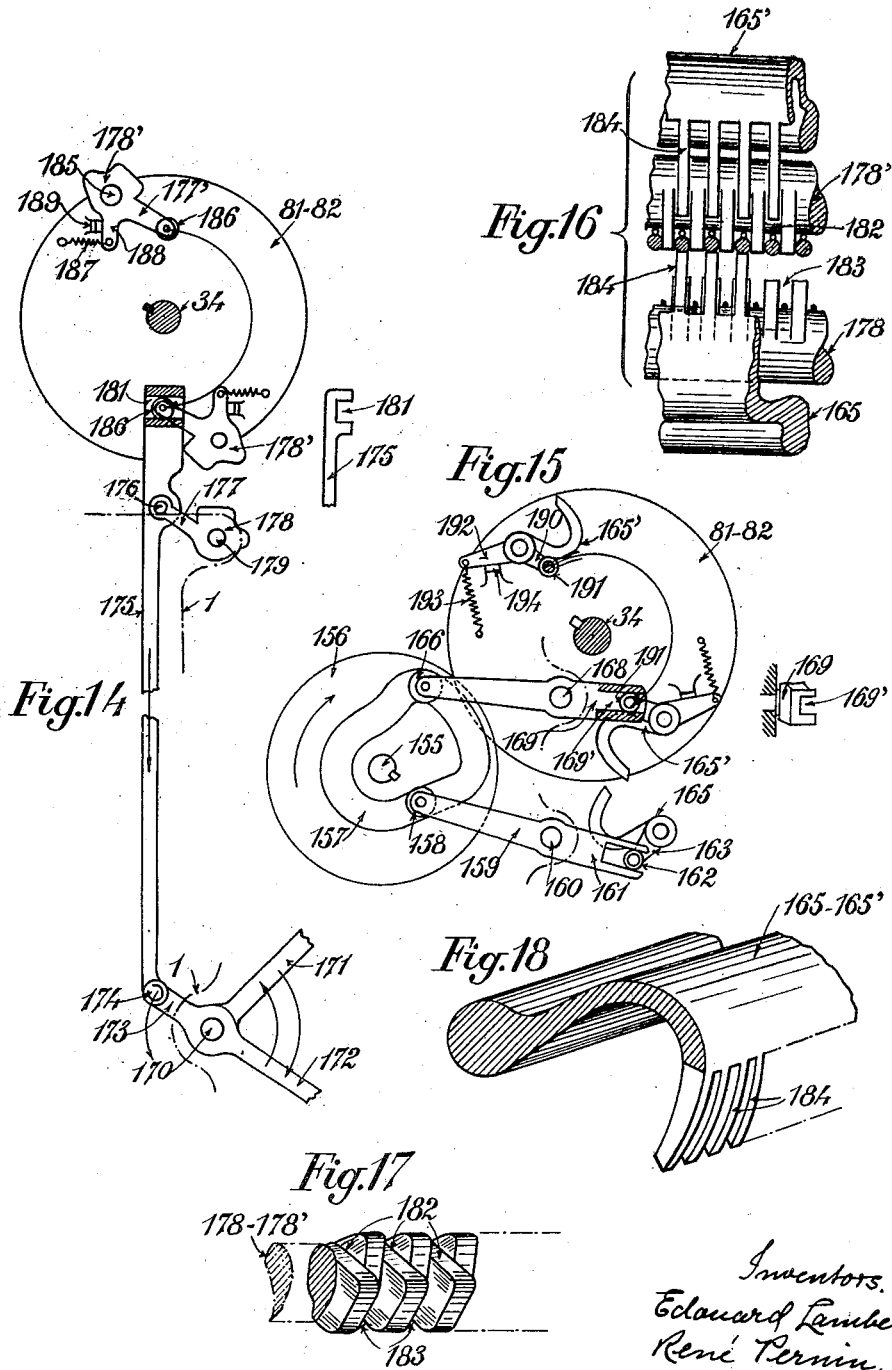

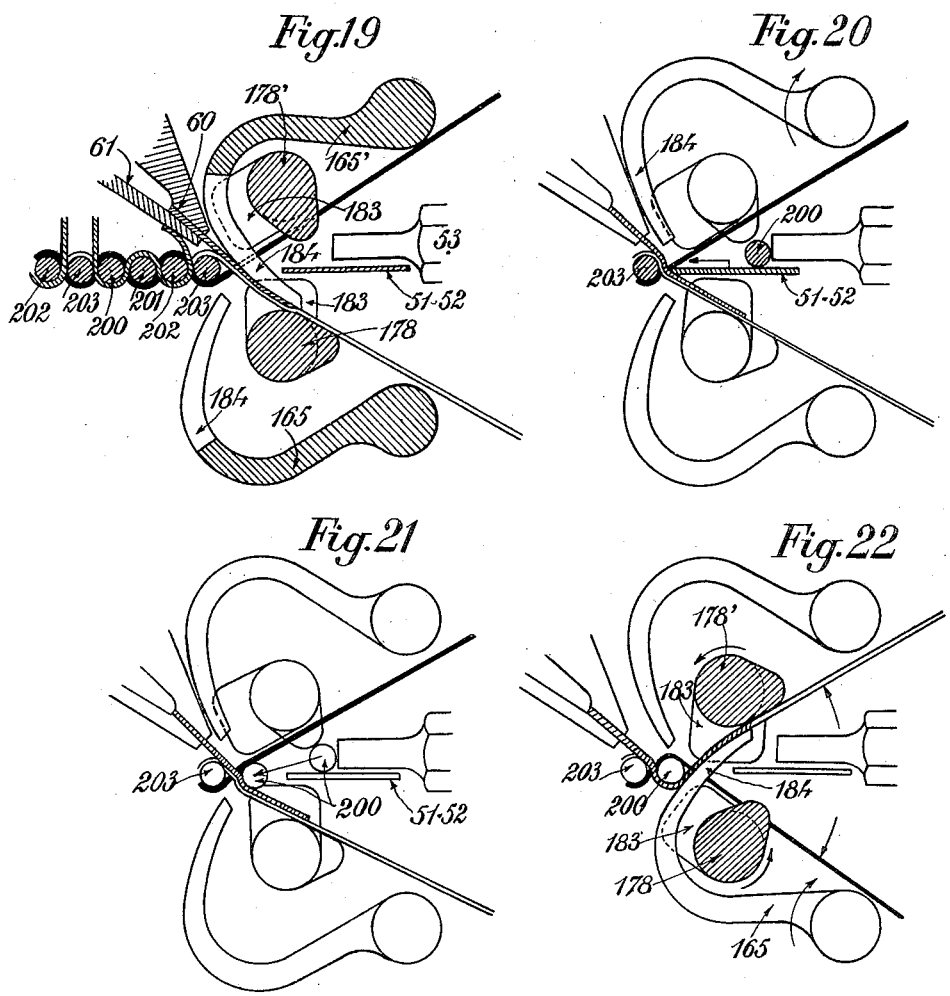

1,428,786.

Patented Sept. 12, 1922.

Patented Sept. 12, 1922.

1,428,786

UNITED STATES PATENT OFFICE.

EDOUARD LAMBERT, OF PARIS, AND RENÉ PERNIN, OF LA PLAINE ST.-DENIS, FRANCE.

MECHANICAL PROCESS OF WEAVING.

Application filed May 21, 1920. Serial No. 383,245.

*To all whom it may concern:*

Be it known that we, EDOUARD LAMBERT and RENÉ PERNIN, engineers, citizens of the French Republic, and residing the first at 63 Rue de Rome, Paris, Department of the Seine, France, the second 249 Avenue de Paris, La Plaine St.-Denis, Department of the Seine, France, have invented certain new and useful Improvements in Mechanical Processes of Weaving, of which the following is a specification.

This invention relates to a mechanical process of weaving. The process has for its object to draw threads (non-continuous threads) from a spool reservoir and to lead them and insert them successively into desired points of the fabric during the weaving process in a direction parallel to the warp threads. The non-continuous threads may be of any desired kind or of different kinds, of any colour or of different colours, or of any kind and any colour varying from one thread to the other.

This process enables a fabric to be obtained in which in addition to the usual continuous warp threads, non-continuous threads are woven into the fabric and variously distributed, either over the whole surface of the fabric thus made or only at certain points according to the positions the threads to be inserted in the fabric occupy respectively on the spool reservoir.

This process is carried out by means of a loom which besides having the arrangements necessary for the weaving of the fabric has two other groups of mechanism namely:

1. A group of mechanisms forming an arrangement called a distributor, designed to take the ends of the threads and lead them to the point of insertion in the fabric. A cutting arrangement for these threads is attached to the distributor.

2. A group of mechanisms designed to insert the ends of the threads brought by the distributor into the fabric during the weaving.

One form of machine suitable for carrying out the process is shewn in the accompanying drawings in which:

Fig. 1 is a front elevation of the machine, the horizontal beam on which the shuttle carriers move not being shewn to avoid confusion of the drawing.

Fig. 2 is a vertical section on line A—B, Fig. 4ª, the vertical frame being shewn in dotted lines only in order to allow certain parts to be seen.

Figs. 3, 4 and 4ª if joined together represent a side view of the machine in section on line C—D, Figs. 1 and 2. The horizontal beam on which the two shuttle carriers move is indicated on each side of the machine only, in dotted lines. The shuttle carriers and the shuttle are also indicated in dotted lines.

On these figures a certain number of transmission or control gears are simply shewn in dotted lines with the object only of shewing how the movement of the actuating pulley is transmitted to the different arrangement to which the invention relates.

Fig. 5 shews certain parts of the machine which are only partially shewn in Fig. 3, drawn to a smaller scale.

Fig. 6 is a diagrammatic representation of the assembled machine corresponding to Figs. 3, 4 and 4ª which should be approximately assembled on the lines E—F and E′—F′.

Fig. 7 is a diagrammatic view showing how beating up of the pick is obtained. The shuttle carriers are shown in full lines in the positions they occupy during the passage of the shuttle from one carrier to the other, when the displacement of the leaves is produced for beating up the threads, while the shuttle carrier on the right is shown in dotted lines in the position it occupies when the shuttle is outside of the edges of the fabric, the corresponding leaf being at its rearward position, where the beating up of the pick is not taking place. For the sake of clearness, the shuttle carrier on the left has not been shown in the same outward position.

Figure 7ª is a perspective view showing one of the links supporting a leaf and the crank and cam groove which displace the leaf for beating up the threads.

Figure 8:
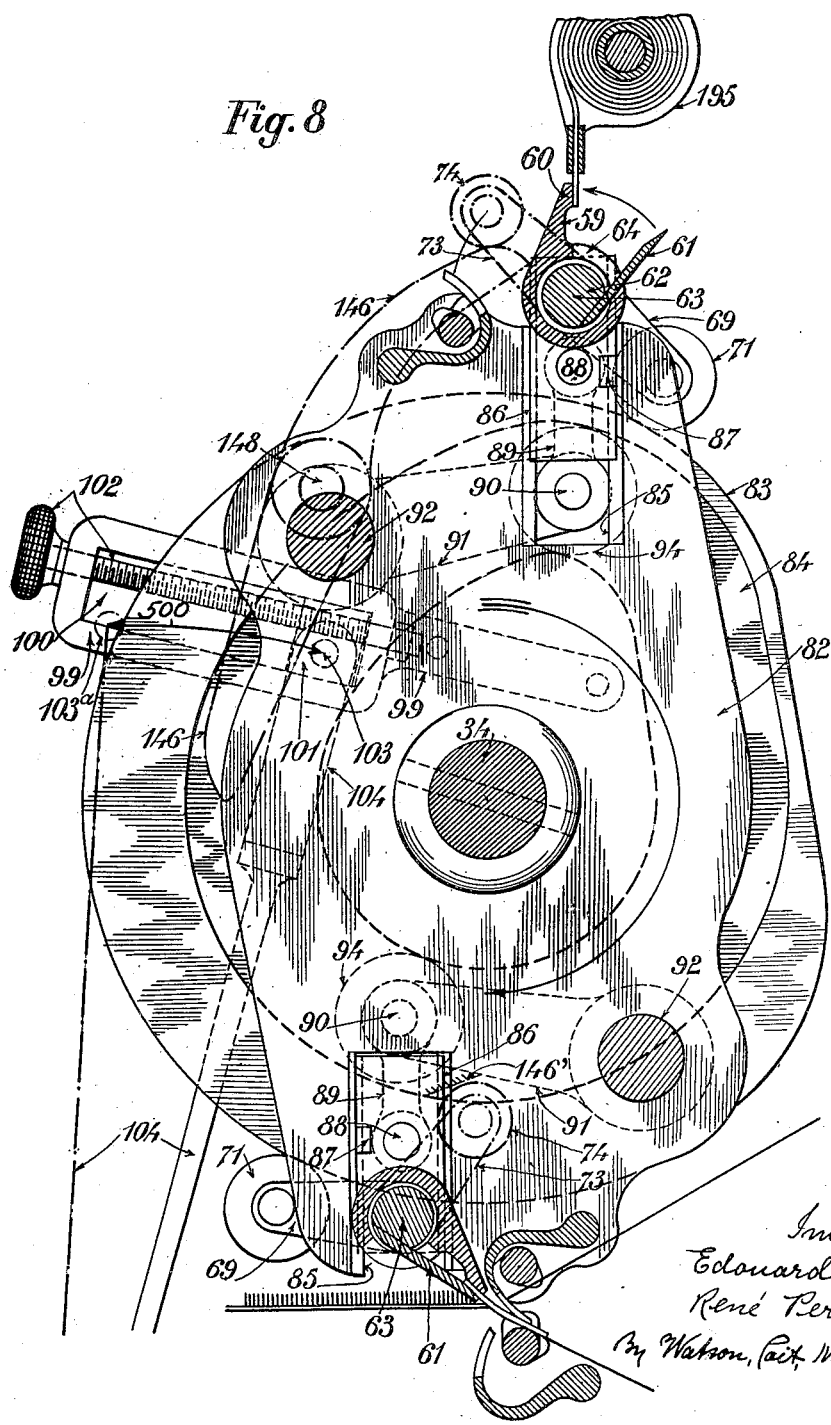

Fig. 8 is a front view drawn to a larger scale of one of the sides of the distributor, the section being approximately on the line G—H Fig. 9ª.

Figs. 9 and 9ª shew together a side view of the distributor. The middle portion which comes between these two figures is similar to that which is shewn on the left portion of the side placed on the right in Fig. 9ª.

Fig. 10 shows diagrammatically the function of the cam which is loosely mounted on the axis of rotation of the distributor.

Fig. 11 is a cross sectional view shewing the gripping arrangement with its various mountings.

Fig. 12 is an elevation partially in section on the line I—J Fig. 13 of the arrangement which cuts the threads held by the grippers.

Fig. 13 is a plan of the cutting arrangement.

Fig. 14 indicates diagrammatically the method of controlling the rods guiding the threads.

Fig. 15 indicates diagrammatically the method of controlling the hook members which serve to move the threads held at one of their ends by means of the gripper.

Fig. 16 shews a portion only of the hook members and the guiding rods of the threads, in one of the positions which these parts occupy during the weaving. For greater clearness the threads and consequently the spacing of the guiding elements are shewn greatly exaggerated.

Fig. 17 is a perspective view of a portion of the guide rods, the guiding displacements thereof being shewn greatly exaggerated.

Fig. 18 is a perspective view of a portion of the hook members in which the points are shewn much thicker and more separated than they will be in reality.

Figs. 19 to 30 are diagrams illustrating, by progressive steps the manner in which the insertion of the non-continuous threads in the fabric may be carried out.

Fig. 31 is a greatly enlarged view of a portion of the finished fabric, the section being along one of the warp threads.

Fig. 32 is a cross section on line K—L Fig. 31.

Figs. 33, 34 and 35 shew different kinds of tufts which the machine can make.

Referring to Figs. 1–5, it will be seen that the machine comprises essentially two side frames 1 and 2, connected together by the cross beam 3.

The bearings 4, supporting the shaft 5, are mounted on the frame 1. The shaft 5 carries the pulley 6, the fly wheel 7 and the gear wheel 8. The wheel 8 meshes with the wheel 9 keyed on the shaft 10 which is carried in bearings on the cross beam 3. The gear wheels 11, 12 are keyed on the shaft 10. The wheel 11 see Figures 1 and 3 meshes with the toothed crank disc 13 which is keyed on shaft 14 the latter being supported in bearings 15, secured on frame 1.

On shaft 14 the pinion 16 is keyed engaging with the wheel 17 in its turn keyed on shaft 18 which is carried in bearings 19, secured to the frame 1.

Two cams 20, 21 are keyed on shaft 18 between which the slide rod 22 mounted on shaft 18 can slide, said rod having a roller 23 rolling on the cam 20 and the roller 24 rolling on the cam 21, see Figure 5.

One end of the rod 26 is jointed to the disc crank 13 by a pivot 25, whilst the other end of this rod is pivoted at 27 to a rack 28 sliding in a guide 29 fixed to the frame 1. The slide guide 29 supports a guide 30 which holds and guides the upper part of the rod 22 already guided at its lower end by its slide on shaft 18.

The rod 22 terminates at its upper end in a hook 31 throwing into gear the roller 32 mounted on the toothed wheel 33 keyed on the shaft 34 in such relation to the rack 28 that this rack and toothed wheel can engage at a certain moment.

On the toothed wheel 33 two rollers 32 are mounted and placed symmetrically. Blank portions 35 are formed between some of the teeth of the wheel 33 see Figure 1, oppositely to these rollers, allowing the rack 28 to move freely without engaging the wheel teeth at certain moments.

The shaft 34 is journalled in the bearing 36 in frame 1 and in the bearing 37 on frame 2.

The wheel 12 engages with the wheel 38 on the shaft 39 turning in bearings fixed to the cross frame 3 and this wheel 38 gears with wheel 40 on shaft 41 also turning in bearings fixed to frame 3. A bevel wheel 42 is connected to wheel 40 engaging with a bevel wheel 43 keyed on shaft 44 journalled in a bearing 45 on frame 3 and in a bearing 46 on frame 2. Outside frame 2 and at the end of shaft 44 the two pinions 47, 48 are keyed side by side.

If the pulley 6 or fly wheel 7 are rotated, wheel 9 will be rotated which through pinion 12 causes wheels 38—40, the bevel pinions 42, 43, and pinions 47 and 48 to turn.

Further, at the same time, through pinion 11, the crank disc 13 will turn and through pinion 16 the wheel 17 and thus cams 20, 21 which actuate the rod 22, will all be operated.

The disc crank 13 in turning reciprocates the rack 28 through rod 26 and in turning, the cams 20—21 so move the rod 22 that during the forward movement of rack 28, the hook 31 of said rod engages the roller 32 and thus the wheel 33, from which it follows that the rod 26 causes the teeth of this wheel to engage with rack 28 which has the effect of rotating shaft 34. As the roller 32 travels on an arc of a circle it leaves the hook 31. The hook stops, returns towards the bottom and then takes up its path towards the top to engage with the roller 31 arranged symmetrically to the roller 32, stopping the rotation of the wheel 33 in this manner and consequently the shaft 34.

At this instant the rack 28 stops, then returns toward the bottom without engaging with the wheel 33 by reason of the flat 35.

This movement is analogus to that employed in linen printing machines and known as the "cylinder stop", except that the whel 35 instead of making a complete turn as in said machines here makes only a half turn in engagement with the rack, during the forward stroke of said rack, after which it stops during the time the rack descends, rises and falls again.

It follows that the shaft 34 periodically makes a rotation of half a turn, followed by a rest for a certain period during which the rack continues its movement freely.

By the interposition of a known system of reciprocating movement called "a railway" comprising a set of gear wheels 38$^a$, rods 38$^b$ and racks 38$^c$ and 38$^d$, the wheels 38 and 40 produce a positive control of the shuttle.

Through this reciprocation movement two shuttle carriers 49, 50 symmetrically arranged on each side of the machine so that they can slide on the horizontal beam 3$^h$, separate and approach each other in order to stop at the centre of the shed.

Figs. 3, 4 and 6 show diagrammatically the arrangement of the parts employed for obtaining this result.

The shuttle 53, carried by one of the carriers whilst the other comes to meet it empty, passes mechanically and automatically on to the other carrier at the moment when both carriers stop at the middle of the shed. The shuttle, continuing its movement with the carrier which holds it, passes in this manner from one side to the other of the machine.

The carrier 49 carries a leaf 51 and the carrier 50 a leaf 52 which at the middle of the shed beat up the pick during the stop of the carriers at the dead point of their reciprocation (Fig. 7).

This beating up is obtained by means of a grooved cam 54 fixed on the slide surface 55 of the horizontal beam 3$^h$ on which the shuttle carriers slide, see figures 3, 4$^a$, 6 and 7.

Each of these leaves 51, 52 is supported on two links 56, 57 of the same length and jointed to the side of the corresponding carrier so as to be parallel to one another.

Each link 57 is connected to a crank carrying a roller 58 rolling in the groove of cam 54. When the roller 58 which moves with the carrier meets the rise on the fixed cam 54 at a certain moment the leaf describes a parallelogram link movement, the shorter sides of which are formed by the links 56 and 57. This movement of the leaves serves to beat up the pick.

In Fig. 7 the leaves 51, 52 are shown in full lines in the beating up position.

The group of parts forming the "distributor" are mounted on the shaft 34 which also carries certain elements of the group of parts designed for the insertion of the ends of thread in the fabric.

The parts of the first group comprise special grippers which are at least as long as the fabric is wide (Figs. 8, 9, 9$^a$ and 11). Each of these grippers consists of a part 59 having two longitudinal ribs of which one 60 serves to hold a leaf 61 secured to a bar 62 oscillating about an axis 63.

The part 59 is open throughout its whole length to permit the movement of the leaf 61 and terminates at each of its ends in the form of a tube 65.

At each end 65 of the part 59 brackets 66 are secured carrying pivots 68 and a projection 67. A crank 69 passes into one of the brackets 66 and has at one end a pivot 70 and at the other end a pivot carrying a roller 71. A pin 72 passes through the end 65 of the part 59, the bracket 66 and the crank 69, so that the roller 71 is rigidly connected to the part 59. This construction is shewn in Fig. 9$^a$.

In the bracket 66 opposite to the one above described on the other end of the part 59, the crank 73 is journalled and carries a roller 74 which entering into the bar 62 is pinned at 75 to this bar, the other end of which turns on the end of the shaft 70 (Fig. 9$^a$). The roller 74 is thus rigid with the bar 62 and consequently with the leaf 61 secured to this bar.

It should be mentioned that the axis of the cranks 69, 73, the pivots 68 and the bar 62 are all on the same axis 63 so that any relative movement of the rollers 71, 74 produces a rotary movement about the common axis 63 of the part 59 relatively to the leaf 61 (a scissor-like movement). The leaves 61 and 62 can thus come into contact at their free edges or on the contrary can separate one from the other.

About each of the ends of the parts 59 and 60 called the "holder" (while the part 61—62 is called the "gripper") is arranged a tail portion 77 carrying an eye 78 at its end to which is attached one of the ends of a spring 79, the other end of the spring being attached to the end of a lever 80 (Fig. 11) passing through an opening 76 formed in the holder 59—60 and secured to the bar 62 and thus to the gripper so as to be rigid therewith.

From this arrangement it follows that the tension of the springs 79 act to hold the gripper constantly against the holder and any material taken between this gripper and holder will be held by the whole system which can be moved in the space without this movement of the parts, except in case of contacts on the roller 74, having any influence on the tension of the springs and consequently on the gripping.

On the shaft 34 are keyed and pinned two plates 81, 82 at a distance apart greater than the width of the widest fabric to be made, see Figure 6.

On the shaft 34 and held between the plate 82 and the bearing of the bracket 34 the plate 83 is placed, the outer edge of which forms a cam and in the thickness thereof a cam groove 84 is provided. This plate 83 is mounted idly on shaft 34.

Each plate 81—82 has two rectangular grooves 85, placed symmetrically in relation to the axis of the shaft 34 and corresponding one with the other. The axes of these grooves are parallel to the vertical when the shaft 34 is held in its stop position by the fork 31 (Figs. 8, 9, 9ᵃ and 10).

In the grooves 85 the sliders 86 are guided and moved. These sliders carry the shoulders 87 (Fig. 11) on which the shoulders of the bracket 66 of the grippers abut. A shaft 88 passes through each slider 86 and one of the ends of a link 89 is jointed to this shaft, the other end of the link being jointed to the shaft 90 of levers 91 connected to the shaft 92 supported by the two plates 81, 82 and able to turn in the latter. A crank 93 carrying a roller 94 is mounted and pinned at 95 on the shaft 92, see Figures 8, 9 and 9ᵃ.

The pivots 68 turn in the upper part of the sliders 86. It follows from the above description that when the roller 94 is actuated it causes the whole of the gripping mechanism to move in the grooves 85 of the plates.

The roller 71 rolls on the outside of the cam 83 and the roller 94 in the cam groove 84.

Springs 96 fixed at 98, for example to the hubs of the plates 81, 82 and also to the pivots of the brackets 66, ensure the contact of the shoulders 67 and 87 and thus the security of the gripping mechanism.

A lever 99 is secured to the cam 83 in the closed slide 100 in which the block 101 controlled by a screw 102 is able to slide. One end of a forked rod 104 is pivoted at 103 to the block 101 and holds the idle cam 83 in a fixed position or causes it to turn through a certain angle on the shaft 34 (Fig. 8).

The arrangement for cutting the threads is shewn in detail in Figs. 12 and 13 and comprises a slide guide 105 supported on the frames 1 and 2 in which the bar 106 slides, the outer portion of which carries a rack 107 engaging with a pinion 108 turning idly on a shaft 109 fixed to the guide 105. A bevel pinion 110 is connected to the pinion 108 and gears with a bevel pinion 111 keyed on a shaft 112 carried on a support 113 fixed to the guide 105, and by a bearing 114 in the frame 2, see Figure 13. A pinion 115 is keyed to the end of shaft 112 and engages with a toothed sector 116 forming a double lever pivoted on the axis 117 fixed in the frame 2, see Figure 2, the end of said lever carrying a roller 118 engaging with a cam groove 119. This cam 119 is mounted on a toothed wheel 120 turning on a shaft 121 fixed to the frame 2 and engaging with the pinion 48, see Figure 2.

On the flat portion of the rack 107 rigid with the bar 106 is fixed a support 122 which carries a pinion 123 idly mounted on a shaft 124 and engaging with a rack 125 fixed to the guide 105 and also with a pinion 126 carried on a cutting disc 127 turning about a shaft 128 carried in the support 122.

A cutting blade 129 is mounted on a part 130 which oscillates about shafts 131 carried in the frames 1 and 2 by means of a lever 132 carried at the side of the frame 2 and to which a connecting rod 133 is pivoted at 134, see Figures 12 and 13.

The pinion 47 carried on the shaft 44 (Fig. 2) engages with a toothed wheel 135 carrying a cam 136 which turns idly on a shaft 137 fixed in the frame 2. A roller 138 rolls on the edge of this cam 136 and is mounted on a lever 139, pivoted on a shaft 140, fixed to the frame 2 and controlling a rod 141 which in its turn controls a lever 142 keyed on a shaft 143. This shaft is journalled in the frame 2 and extends across the machine and is supported by the frame 1 (Fig. 1) and controls a lever 144 which controls a rod 145 which by means of a lever 147 connected to a cam 146 placed opposite the roller 74 causes the latter to oscillate about a shaft 148 carried in frame 1.

On the frame 1, see Figure 9 at a suitable point a fixed cam 146′ is mounted, the object of which is to open the grippers 60, 61 slightly at the moment when the distributor commencing its half rotation it is necessary that the non-continuous threads inserted in the fabric should be released from the grippers.

On one of the faces of the cam 136 a cam groove 149 is formed in which a roller 150 rolls (Fig. 2). This roller is mounted on a lever 151, 152 oscillating about a pivot 153 in the frame 2. The portion 152 of the lever controls the rod 133 actuating the cutter 129 and also the rod 104 holding the cam plate 83.

A wheel 154 gears with the toothed wheel 135 and turns on a shaft 155 mounted on the frame 2 and carrying a grooved cam 156.

In the groove 157 of this cam a roller 158 rolls, actuating a lever 159 oscillating about a pivot 160 fixed in the frame 2 and controlling a fork 161 in which a projection 162 on a lever 163 controlling a bar 165 engages (Figs. 2, 4, 4ᵃ and 15).

Further, in the groove 157, see Figure 15, rolls a roller 166 actuating a lever 167 oscillating about a pivot 168 fixed in the frame 2 and controlling a fork 169.

The levers 161 and 169 are designed to operate a certain portion of the mechanism for inserting the threads as will be hereinafter described.

Rods 171 and 172 see Figure 14 are pivoted to the frame 1 at a point 170 for the purpose of actuating the harness carrying the heddles. The control of these rods 171, 172 is not shewn. The mechanism actuating the harness does not form a portion of the present invention.

The rod 172 is extended at 173 beyond the point 170 and is hinged at 174 to a rod 175. This rod 175 is hinged near its upper end, at 176, to a small lever 177 rigid with a bar 178 called the thread guide, journalled at 179 in supports 180 fixed on each side of the frames 1 and 2. The upper end of this rod 175 has a groove 181 on one side.

The object of the oscillatory movement of the lever 172 about the point 170 is to give a reciprocating movement to the rod 175, this movement being utilized jointly with that given to the levers 161 and 169 to actuate the whole of the mechanism for inserting the non-continuous threads. The mechanism for inserting the non-continuous threads in the fabric comprises two sets of parts; one part carried by the distributor 81, 82 and the other part mounted on the frames 1 and 2. These two sets are identical and each comprises:—

*a.* An oscillating rod for guiding the warp threads and the non-continuous threads;

*b.* An oscillating rod for acting on the free part of the non-continuous threads held by the grippers for causing these threads to knot around the pick.

As the distributor carries two grippers 60, 61 diametrically opposite, it follows that the distributor also carries two sets of rods for guiding and inserting the threads. One of these sets works at the weaving point jointly with the guiding and inserting rods carried by the frames 1 and 2 during the time that the second set carried by the distributor is at rest.

Figs. 8, 9, 9ª and 16 to 19 shew by way of example the form which can be given to the guiding and inserting rods. Each guide rod (Fig. 17) is provided with two series of grooves 182, 183 designed to lie in the plane of each series of warp threads respectively. In oscillating the guide rods alternately present the grooves 182 and 183 alternately to the corresponding warp threads.

Each thread inserting rod (Fig. 18) is so shaped that it has a substantially hook shaped section. The rod is cut for a length equal to the width of the fabric so as to form a series of teeth 184 between which the warp threads of one series are engaged whilst the backs of these teeth act upon the non-continuous threads.

The inserting rod 165 carried by the frames 1 and 2 oscillates at its ends in supports 180 in which supports the guide rod 178 also oscillates, see Figure 9ª.

The inserting rods 165′ and the guide rods 178′ carried by the distributor oscillate in bearings solid with the sides 81 and 82. It will be seen from Figs. 9 and 9ª that the inserting rods 165 and 165′ are controlled by an arrangement carried on the frame 2, and that the guide rods 178 and 178′ are controlled by an arrangement carried on the frame 1.

Referring to the diagram in Fig. 14, it will be seen that each of the guide rods 178′ can oscillate at 185 on the sides 81 and 82 and that these rods each carry a lever 177′ having a roller 186 at its end. The rods 178′ are held in a fixed position by means of springs 187, one end of each spring being attached to the side of the distributor 81 and 82, the other end being connected to small levers 188, rigid with the rods 178′. The springs 187 hold the rods 178′ in the desired position by causing the levers 188 to bear upon the abutments 189 carried by the side. This position of the rods 178′ is such that when the distributor makes half a revolution about its shaft 34 the roller 186 on the bar 178′ which occupies the lower position shown in Fig. 14 leaves the groove 181 in the rod 175, and towards the end of the half revolution of the distributor the roller 186 on the opposite bar 178′ replaces the first roller and engages in the groove 181 on the rod 175. That is to say, the mechanism comprising the spring 187 and the abutment 189 keeps the roller 186 in the slide during the time when the plate 82, keyed on the shaft 34, stops. The separation takes place at the moment when shaft 34 is again started to rotate.

When this rod 175 is actuated by the lever 173 its movement causes a simultaneous oscillation of rods 178 and 178′.

Referring to Fig. 16, it will be seen that the guiding grooves 182 of the guide rod 178 correspond to the grooves 182 on the guide bar 178′, that is to say, that these grooves are situated in the same vertical plane. Similarly for the grooves 183. But the guide bars 178 and 178′ are mounted in such a manner one relative to the other that the full parts separating the grooves 182 of one of the rods are always opposite to the grooves 183 and inversely when the rods 178 and 178′ are oscillated through a certain angle the full parts separating the grooves 183 of the first of these rods are opposite the grooves 182 in the other rod.

This arrangement secures proper thread guidance irrespective of the position the threads may afterwards have in the shed.

Referring to the diagram Fig. 15 it will be seen that the inserting rods 165' carried on the sides 81, 82 of the distributor have secured upon their axes levers 190 each terminating in a roller 191. On the rods 165' levers 192 are secured to which springs 193 are attached at one end, said springs being also attached to the corresponding side of the distributor by their other end.

The springs 193 hold the rods 165' in the desired position by causing the levers 192 on these rods to contact with the abutments 194 carried on the side of the distributor. This position of the rods 165' is such that when the distributor rotates through 180° about its shaft 34, the roller 191 on the rod 165' carried at the lower part of the distributor leaves the groove 169' in the control lever 169 and towards the end of the rotation of the distributor the roller 191 on the opposite rod 165' engages in the groove 169'.

What has been said above with regard to parts 186, 187 and 189 in Figure 14 also applies to parts 191, 193, 194 in Figure 15.

Above the machine a series of spool reservoirs 195 are arranged, each consisting of spools of threads of the number and colour corresponding to the kind of fabric that is to be woven, the position of these spools corresponding to that of the teeth 184 on the inserting rods 165 and 165'.

Each of these reservoirs 195 gives the quantity of threads which is necessary in the course of manufacture for a complete cycle of the machine.

An arrangement of any suitable parts allows a new spool reservoir at each complete cycle of operation of the machine to be brought automatically to a determined fixed point to replace that which has furnished the thread necessary for the preceding cycle.

The operation of the machine is as follows:—Referring to Figs. 1, 3, 4, 4ª and 6, it will be seen that the power applied by a belt to the pulley 6 is transmitted through the various shafts and gearings, the movements of which have been described above, and is distributed to the different arrangements forming the machine.

Amongst these arrangements is the distributor 81, 82 with the parts which it carries in the position shown in Fig. 8, for example, that is to say in the position which it occupies at the moment when it is at rest after making a rotation of 180° about its shaft 34.

At this moment the roller 74 of the gripper 61 at the upper part of the distributor is mounted on the oscillating cam 146, whilst the roller 71 of the holder 59 holds the part 60 thereof in a position corresponding to the fixed and constant point where the ends of the threads come from the spool reservoir 195 and in contact with these threads.

The cam 146 then turns on its axis and the gripper 61 closes and locks these threads on the portion 60 of the holder 59.

The idle cam 83 actuated by the rod 104, turns through a certain angle on the shaft 34 and takes up, for example, the position shown in Fig. 10. During this movement of the cam the groove 84 acts on the top roller 94 and causes the slide 86 carrying the whole of the gripper to descend the desired distance and to unwind a corresponding quantity of thread from the spool reservoir 195.

Simultaneously with this oscillation of the cam 83 the cutting blade 129 which is in position to allow the operation of the gripper 61, that is to say separated from the threads, is brought into contact with the threads in the position shown in Fig. 12. The cutting disc 127 which is stopped at one end of its stroke as shown in dotted lines of Fig. 13, is set in motion and rolls on the blade towards the opposite frame, successively cutting all the threads which it meets during its passage up to the end of its path.

The distributor is finally set in motion about the shaft 34 to complete a half revolution, by means of rods 22 and 26, rack 28, and gear wheel 33. The roller 71, rolling on the edge of the cam 33, causes the parts of the gripper 61 and the holder 59 to close progressively and carry along the non-continuous threads which come to be cut.

The return of the cam 83 to the initial position shown in Fig. 8 takes place during the first part of the half revolution of the distributor and at the same time the cutting blade 129 turns aside the threads so as to allow the operation of gripper 61 during the opening of this latter.

During this time the change of position of the harness takes place and the distributor finishes its rotation at the moment when the warp threads of the fabric have taken up their crossed position, so that the non-continuous threads are inserted between the warp threads which at this instant are above them.

It is necessary to state that during the gripping and cutting of the threads the members positioned at the lower part of the distributor are so placed and operated that the non-continuous threads are inserted in the fabric during the weaving of the fabric itself, at a time during which the threads are always held by the grippers. But when the distributor makes its half revolution it carries with it, as will be well understood, the set of opposite part which has inserted the threads in the fabric. At the beginning of this change of position, the lower gripper is slightly opened, by the meeting of its roller 74 with the fixed cam 146′ and thus releases the inserted threads when the empty gripper closes.

The distributor continuing its movement, the roller 74 moving from the bottom meets the oscillating cam 146 which comes into the position shown in Fig. 8 as soon as the distributor begins to turn. The cam 146 causes the roller 74 to oscillate about the pivot 63 of the gripper 61 to lead this gripper into the open position shewn in Fig. 8 when the distributor comes to the end of its half revolution. At the same time that the roller 74 meets the cam 146, the roller 71 of the corresponding holder 59 (the roller which is held in contact with the cam 83 by spring 96) leads this holder into the position in which the part 60 of this holder is in contact with the threads coming out of the spool reservoir, which, during the rotation of the distributor, is brought automatically to replace the spool reservoir from which the threads released by the holder at the lower part of the distributor have been drawn previously.

This is the position from which the description of the operation of the apparatus was started and the cycle of operations is repeated continuously under the same conditions.

The insertion of the non-continuous threads in the fabric during the weaving takes place in the manner refered to in the description of Figs. 19–30.

In these figures the weft threads are shewn greatly enlarged in order to shew the composition of the fabric more clearly. Further, the holder 60 and the gripper 61 are respectively shewn at progressively increasing distances from the crossing point of the warp threads. This progressive spacing of the parts 60 and 61 is not produced in reality during the insertion of the non-continuous threads but by reason of the dimensions given to the weft threads in relation to the warp threads and to the inserting members, the parts 60 and 61 have been thrown back in the drawings.

Fig. 19 shews the position of the parts at the moment when the distributor has just finished its half revolution.

It will be seen from this figure that the non-continuous thread held by the gripper engages with the lower warp thread in the groove 183 of the lower guide rod 178 and that the end of the tooth 184 of the upper inserting rod 165′ is also engaged in the same groove 183 above the non-continuous thread. The tooth 184 thus engages with the groove 183 of the upper rod 178′ and also in groove 183 in the lower rod 178. The purpose of the tooth 184 is thus to cause the non-continuous thread to take the place it occupies in the figure. At this moment the shuttle 53 is outside the shed at one end of the machine.

When the shuttle 53 engages in the shed and passes the pick 200 between the warps, and when it is at the middle of the shed, the leaves 51, 52 of the shuttle carries beat up the pick previously passed and immediately recede. This is the period shewn in Fig. 20. The beating up is due to the pressure of the leaves 51, 52 acting on the warp threads and on the non-continuous threads at the same time. It should be noted that the tooth 184 on the upper rod 165′ has been previously automatically lifted, immediately before the forward movement of the leaves 51, 52.

Fig. 21 shews what follows. The shuttle 53 having reached the other end of the shed after having completely passed the pick 200, the shed is formed, Fig. 22.

In consequence of the change in position of the warp threads, those which are represented by two parallel lines and which formerly were at the bottom are passed upwards in place of the warp threads represented by heavy black lines. These latter then occupy the lower position.

Simultaneously with this change of position of the warp threads the guide rods 178 and 178′ oscillate so as to present the corresponding grooves to the warp threads so that the threads become engaged in these grooves as shewn in Fig. 22. It will thus be seen on this same figure that the lower inserting rod 165 has oscillated at the same time that the shed is produced, so that the tooth 184 on this rod causes the free end of the non-continuous thread to take up the position shewn in Fig. 22, a position in which the non-continuous thread may be led in addition by the mounting of the warp thread shewn in thin lines, if the non-continuous thread is placed so that it covers the thin line warp thread for its whole length, by reason of the arrangement adopted for the connecting up of the various parts, in this case it amounts to saying that the use of the inserting rod 165 is no longer necessary.

But given that it is desired to obtain a fabric in which the non-continuous threads are inserted around the weft and between the warps and not along the axis of one of the warp threads, it is necessary to continue the use of the lower inserting rod 165, especially as it does not give rise to any inconvenience.

Figure 23:
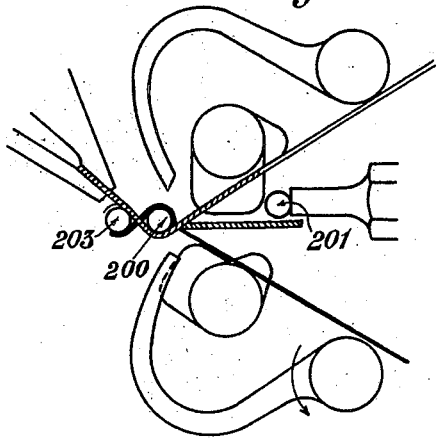

It will be seen from Fig. 23 that in the following phase the shuttle 53 after having reached the end of its path returns into the shed and passes a new pick 201, while the beating up of the pick 200 is carried out by leaves 51, 52 under the same conditions as described with reference to Fig. 20. It will of course be understood that the lower inserting rod 165 has previously oscillated so as to separate its tooth 184.

Figure 24:
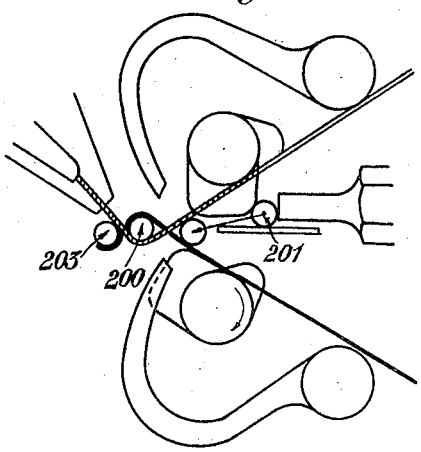

From Fig. 24 it will be seen that the pick 201 has been completely passed and that the leaves 51, 52 have separated from the weaving point. The shuttle then occupies a position outside the shed.

Figure 25:
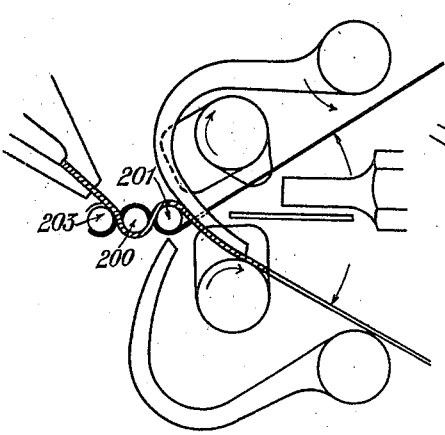

It will be seen from Fig. 25 that the parts occupy a position corresponding to that which they occupy in Fig. 19. The shed has been formed, the guide rods have oscillated together, and the inserting rod 165' has engaged its tooth 184 between the black warp threads causing the free ends of the non-continuous threads to encircle the pick 201 and to engage in the groove 183 of the lower guide rod 178.

Figure 26:
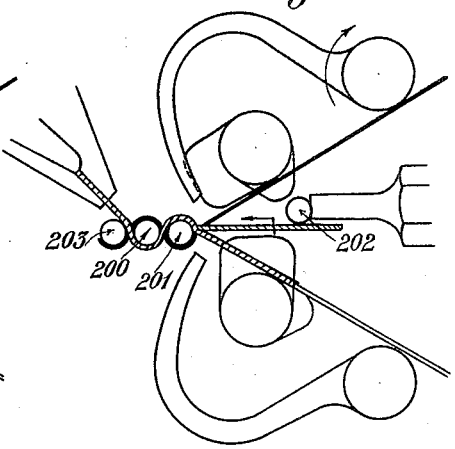

From Fig. 26 it will be seen that the operation of the parts is at this moment the same as that previously described with reference to Fig. 20.

Figure 27:
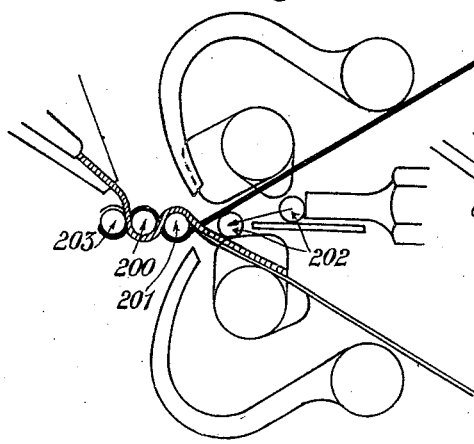
Figure 28:
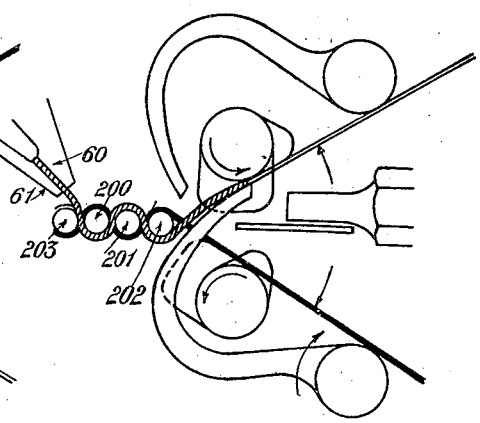
Figure 29:
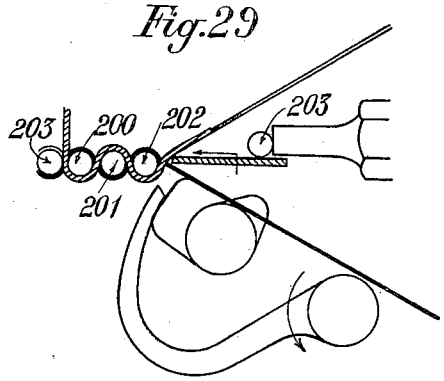

Similarly, the arrangements shewn in Figs. 27 and 28 operate successively in a similar manner to that described with reference to Figs. 21 and 22. A pick 202 has been shot by the shuttle and knotted by the warp threads and the non-continuous threads.

It is after this period of the operation of the inserting mechanism that the distributor 81, 82 begins its half revolution. The gripper 61 opens slightly and releases the non-continuous threads which have been inserted in the fabric. The gripper 61 and the holder 60 separate from the point of weaving and take up a position in the upper part of the distributor as has already been explained.

Whilst the distributor 81, 82 turns on its shaft 34, the shuttle 53, continuing its alternate movement of translation, lays out a pick 203. The beating up of the pick 202 is effected by the leaves 51, 52 as shewn in Fig. 29. It will be understood that the inserting bar 165 has oscillated at the desired moment.

Figure 30:
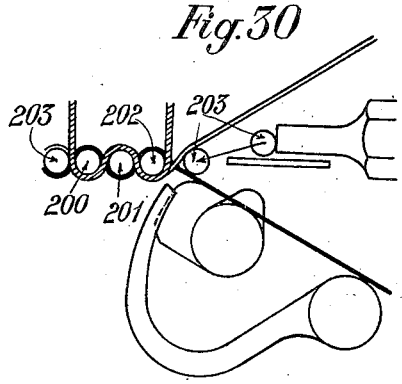

The gripper 61 and the holder 60 have released the non-continuous thread, the one end of which being thus released, raises (Fig. 29); the other end, which is no longer placed under the action of the teeth 184 and of the roller 178', begins to be under the action of the beating up leaves 51—52 and will then take the upwardly raised position as shown Fig. 30.

Thus (Fig. 30) the leaves 51, 52 having been moved back, the shuttle 53 leaves the shed.

Finally, the insertion of the warp threads is produced whilst the distributor, finishing its half revolution, leads a new set of parts 60, 61, 165' and 178 to the weaving point. It will be understood that the gripper 61 and the holder 60 carry a new series of non-continuous threads.

It is interesting to note that during the passage of the non-continuous threads and the teeth 184 of the inserting bar 165' in the crossing zone of the warp threads, the non-continuous threads and the teeth 184 become boxed in between the warp threads which pass from the bottom to the top and at the same time that these non-continuous threads and teeth 184 follow the movement of the warp threads passing from top to bottom. Further, by reason of the rotation of the distributor the non continuous threads are smoothed as it were by the warp threads which ascend. The distributor stops, placing the parts in the position shewn in Fig. 19.

The operations described with reference to Figs. 19–30 are repeated successively as many times as it is desired to insert a series of non-continuous threads in the fabric.

Further, to allow the insertion in the fabric of non-continuous threads of greater or less length, the machine comprises the following arrangement which allows the regulation of the length of the thread unwound and cut by the machine, either during the course of the weaving or before the starting of the machine.

Figs. 8 and 10 shew the two extreme positions occupied by the idle cam 83 for a determined setting of this cam.

In order to vary this setting, the lever 90 is fixed to the cam 83, in such a manner that when the screw 102 is turned in the proper direction by means of its milled head, the slide block 101 is moved in the slide 100.

The pivot centre 103 of the rod 104 can thus be moved to 103$^a$ or to any intermediate point situated between the two extreme positions which the pivot 103 can occupy. Thus the pivot center may occupy any position along the arc indicated at 500. It is necessary to remark in referring to Fig. 2 that the pivot point 104$^a$ of the rod 104 in relation to the control lever 152 is not moved during the turning of the screw 102, this latter moving the pivot 103 in the slide 100 only. It thus follows that the only effect of changing the position of the pivot 103 in the slide 100 is to determine the angular displacement of cam 83 upon shaft 34. This angular displacement corresponds to the angle α (Fig. 10) and has the effect of moving the roller 94 from the position P to the position P'. The centre of the roller 94 is thus dropped by the amount indicated by the small arrows f from which it follows that the holder 60 and the gripper 61 (which at this moment is open) are moved downwards to the same extent.

The top of the holder 60 is thus placed at h' while before the descent of the roller 94 it was at $h$. By this single regulation the holder 60 has thus been moved down from $h$ to $h'$ without interfering with any other part.

The cam 83 being so set and the gripper 61 closing, when by the action of lever 152 (Fig. 2) and of the rod 104, the cam 83 effects its movement about its axis to cause the holder 60 and the gripper 61 to draw the threads from the roller reservoir 195, the amplitude of this movement of cam 83 corresponds to the angle $\beta$ whilst the rod 104 always travels through the same path.

It must be mentioned that if the pivot 103 had been left in the position in which it is shewn in Fig. 8, the amplitude of oscillation of the cam 83 under the invariable action of the rod 104 would correspond to the angle $\gamma$, which would lead the roller 94 to the position $P^2$, whilst if the pivot 103 is moved to $103^a$ as has been explained, the roller 94 only descends into the position $P^3$, whence it follows that between the two positions $P^2$ and $P^3$ there exists a difference, indicated by the small arrows $f'$, which is equal to that indicated by the arrows $f$ in the same manner as $\delta$ is equal to $\alpha$ in respect of the amplitude of oscillation of the cam 83.

It is easy to see from the drawings that the track of the groove 84 is calculated to produce the effects indicated under the conditions mentioned.

It is thus shown that if the pivot 103 is left in the position shown in Figs. 8 and 10 a length of threads indicated at I Fig. 10 (that is to say, the maximum length) will be obtained. The amplitude of oscillation of the cam 83 is indicated by the angle $\gamma$, the pivot 103 oscillating then between 103 and 103'.

If, on the contrary, by means of the screw 102 the pivot 103 is moved to $103^a$, a length of thread indicated at II (that is to say the minimum length) will be obtained. The amplitude of oscillation of cam 83 will then be indicated by the angle $\beta$, and the pivot 103 oscillates between $103^a$ and $103^{a'}$ (Figure 10).

When the pivot 103 occupies an intermediate position along the arc 500 (Figure 8) the length of the severed thread is an intermediate amount between I and II and the amplitude of oscillation of the cam 83 is an intermediate amount between I and II (or $\beta$ and $\gamma$). The difference of length of the thread thus arises from the fact the gripper 61 only seizes the thread after it has moved downwards for a greater or less distance and finally that the threads being held by the gripper, this gripper moves down through a distance more or less great before the threads are cut.

It should be mentioned that the machine permits the insertion of non-continuous threads in the fabric by placing each of these threads in the plane of the corresponding warp thread so that this warp thread is fitted into the thickness of the back of the knots formed by the non-continuous threads (Figs. 31 and 32). From this it results that the composed fabric is woven with great solidity.

In Figs. 33–35 the different points or styles of weaving which can be obtained by means of the machine are shewn according to the different combinations of the functions of the members inserting the threads. It will be understood that other styles derived from those shewn in Figs. 31–35 can be obtained under the same conditions of the functions of the inserting members.

What we claim is:

1. In a power loom comprising a series of warp threads, shed forming mechanism, picking mechanism, beating up mechanism and a series of spools of thread, the combination with such elements of a rotary device turning always in the same sense for inserting the threads, and having two series of means for gripping the threads from the spools, means for serving threads and means coacting with said first mentioned means for inserting such severed threads into the fabric during the weaving process.

2. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two pairs of gripping jaws carried at opposite ends of a diameter of said end plates, each pair of jaws being adapted to hold a series of threads, mechanism for automatically opening and closing said jaws, means for severing threads held in said jaws, and means for inserting such severed threads into the fabric during the weaving process.

3. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two pairs of thread gripping jaws carried at opposite ends of a diameter of said end plates, each pair of jaws comprising two relatively movable members, means for opening and closing said movable jaw members automatically, means for severing threads held in said jaws and means for inserting such severed threads into the fabric during the weaving process.

4. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two jaw members pivotally carried between said end plates, at opposite ends of a diameter thereof, two leaves each mounted on a rotatable shaft carried in close proximity to said jaw members, the leaves co-operating with the jaw members respectively to form gripping means for holding a series of threads, means for automatically oscillating the shafts carrying the leaves and the jaw members to open and close said gripping means, means for severing threads held in said gripping means, and means for inserting such severed threads into the fabric during the weaving process.

5. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two jaw members pivotally carried between said end plates at opposite ends of a diameter thereof, two leaves each mounted on a rotatable shaft carried in close proximity to said jaw members, the leaves co-operating with the jaw members respectively to form gripping means for holding a series of threads, cam levers mounted on each leaf carrying shaft and on the jaw members co-operating with cams mounted on the rotary shaft carrying the side plates for operating the gripping means to draw a series of threads from the spools of thread and to hold and release such series of threads, means for severing threads held in said gripping means and means for inserting such severed threads into the fabric during the weaving process.

6. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two pairs of thread gripping jaws carried at opposite ends of a diameter of said end plates, each pair of jaws comprising two relatively movable jaw members, means for opening and closing said jaw members automatically, a slide guide mounted transversely of the warp threads, a rotary cutting disc slidably mounted in said guide in proximity to the thread spools, and oscillating cutting bar mounted transversely of the warp threads and co-operating with said cutting disc to sever a series of threads drawn from the thread spools by and held in the gripping jaws, means for rotating the cutting disc, means for moving said cutting disc in its guide, means for oscillating the cutter bar and means for inserting the severed threads held by the gripping jaws into the fabric during the weaving process.

7. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two jaw members pivotally carried between said end plates at opposite ends of a diameter thereof, two leaves each mounted on a rotatable shaft carried in close proximity to said jaw members, the leaves co-operating with the jaw members respectively to form gripping means for holding a series of threads, cam levers mounted on each leaf carrying shaft and on the jaw members co-operating with cams mounted on the rotary shaft carrying the side plates for operating the gripping means to draw a series of threads from the spools of thread and to hold and release such series of threads, a slide guide mounted transversely of the warp threads, a rotary cutting disc slidably mounted in said guide in proximity to the thread spools, an oscillating cutting bar mounted transversely of the warp threads and co-operating with said cutting disc to sever a series of threads drawn from the threads spools by and held in the gripping jaws, means for rotating the cutting disc, means for oscillating the cutter bar, and means for inserting the severed threads held by the gripping jaws into the fabric during the weaving process.

8. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two pairs of gripping jaws carried at opposite ends of a diameter of said end plates, each pair of jaws being adapted to hold a series of threads, mechanism for automatically opening and closing said jaws, means for severing threads held in said jaws, two sets of rods mounted between the end plates, each set comprising an oscillating rod for guiding the warp threads and the severed threads and an oscillating rod for acting on the free portion of the severed threads held by the gripping jaws for causing these threads to knot around the weft.

9. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two pairs of gripping jaws carried at opposite ends of a diameter of said end plates, each pair of jaws being adapted to hold a series of threads, mechanism for automatically opening and closing said jaws, means for severing threads held in said jaws, two sets of rods mounted between the end plates, each set comprising an oscillating rod for guiding the warp threads and the severed threads and an oscillating rod for acting on the free portion of the severed threads held by the gripping jaws, and a further set of similar oscillating rods mounted on the loom frame transversely of the warp threads and adjacent the weaving point.

10. In a power loom and in combination, a series of warp threads, shed forming mechanism, picking mechanism, beating up mechanism, a series of spools of threads, a rotary shaft mounted transversely of the warp threads, end plates secured on said shaft, means for intermittently rotating said shaft, two pairs of gripping jaws carried at opposite ends of a diameter of said end plates, each pair of jaws being adapted to hold a series of threads, mechanism for automatically opening and closing said jaws, means for severing threads held in said jaws, and two sets of rods mounted between the end plates, each set comprising an oscillating guide rod having two series of transverse thread guiding grooves in different planes and an oscillating inserting rod of hook shaped section having a series of teeth on its working edge spaced to co-operate with the sets of grooves in the guide rod.

11. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two pairs of gripping jaws carried at opposite ends of a diameter of said end plates, each pair of jaws being adapted to hold a series of threads, mechanism for automatically opening and closing said jaws, means for severing threads held in said jaws, two sets of rods mounted between the end plates, each set comprising an oscillating guide rod having two series of transverse thread guiding grooves in different planes and an oscillating inserting rod of hook shaped section having a series of teeth on its working edge spaced to co-operate with the sets of grooves in the guide rod and a further set of similar oscillating rods mounted on the loom frame transversely of the warp, threads and adjacent the weaving point.

12. In a power loom and in combination, a series of warp threads, shed forming mechanism, pickling mechanism, beating up mechanism, a series of spools of thread, a rotary shaft mounted transversely of the warp threads, end plates secured on said shaft, means for intermittently rotating said shaft, two jaw members pivotally carried between said end plates at opposite ends of a diameter thereof, two leaves each mounted on a rotatable shaft carried in close proximity to said jaw members, the leaves co-operating with the jaw members respectively to form gripping means for holding a series of threads, cam levers mounted on each leaf carrying shaft and on the jaw members co-operating with cams mounted on the rotary shaft carrying the side plates for operating the gripping means to draw a series of threads from the spools of thread and to hold and release such series of threads, a slide guide mounted transversely of the warp threads, a rotary cutting disc slidably mounted in said guide in proximity to the thread spools, an oscillating cutting bar mounted transversely of the warp threads and co-operating with said cutting disc to sever a series of threads drawn from the thread spools by and held in the gripping jaws, means for rotating the cutting disc, means for oscillating the cutter bar, and two sets of rods mounted between the end plates, each set comprising an oscillating guide rod having two series of transverse thread guiding grooves in different planes and an oscillating inserting rod of hook shaped section having a series of teeth on its working edge spaced to co-operate with the sets of grooves in the guide rod.

13. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two jaw members pivotally carried between said end plates at opposite ends of a diameter thereof, two leaves each mounted on a rotatable shaft carried in close proximity to said jaw members, the leaves co-operating with the jaw members respectively to form gripping means for holding a series of threads, cam levers mounted on each leaf carrying shaft and on the jaw members co-operating with cams mounted on the rotary shaft carrying the side plates for operating the gripping means to draw a series of threads from the spools of thread and to hold and release such series of threads, a slide guide mounted transversely of the warp threads, a rotary cutting disc slidably mounted in said guide in proximity to the thread spools, an oscillating cutting bar mounted transversely of the warp threads and co-operating with said cutting disc to sever a series of threads drawn from the threads spools by and held in the gripping jaws, means for rotating the cutting disc, means for oscillating the cutter bar, two sets of rods mounted between the end plates, each set comprising an oscillating guide rod having two series of transverse thread guiding grooves in different planes and an oscillating inserting rod of hook shaped section having a series of teeth on its working edge spaced to co-operate with the sets of grooves in the guide rod and a further set of similar oscillating rods mounted on the loom frame transversely of the warp threads and adjacent the weaving point.

14. In a power loom and in combination, a series of warp threads, shed forming mechanism, picking mechanism, beating up mechanism, a series of spools of thread, a rotary shaft mounted transversely of the warp threads, end plates secured on said shaft, means for intermittently rotating said shaft, two jaw members pivotally carried between said end plates at opposite ends of a diameter thereof, two leaves each mounted on a rotatable shaft carried in close proximity to said jaw members, the leaves co-operating with the jaw members respectively to form gripping means for holding a series of threads, cam levers mounted on each leaf carrying shaft and on the jaw members co-operating with cams mounted on the rotary shaft carrying the side plates for operating the gripping means to draw a series of threads from the spools of thread and to hold and release such series of threads, means for severing threads held in said gripping means, means for inserting such severed threads into the fabric during the weaving process and means for regulating the lengths of the threads drawn from the spools by the gripping means.

15. In a power loom and in combination, a series of spools of thread mounted transversely of the warp threads, a rotary device mounted transversely of the warp threads and having means for gripping a series of threads from the spools, guides on the frame of the loom, means for cutting the threads held in the gripping means comprising a cutting disc mounted on a support slidable in said guides, a rack, toothed wheels and bevel pinions for rotating the disk, and a cutting bar mounted on a support oscillating about spindles rigid with the frame under the action of a rod and a lever jointed together.

16. In a power loom and in combination, a series of thread spools mounted transversely of the warp threads, a rotary device mounted transversely of the warp threads, and comprising means for gripping a series of threads from said thread spools, means for cutting said threads, means for carrying such series of threads towards the weaving point, means for inserting such series of threads into the fabric during the weaving process and a device for regulating the lengths of the threads drawn from the spools, said device comprising a slide fixed to the power cam, a slide block the position of which is controlled by a screw and a rod jointed on said slide block at a point being at will placed far from the axis of rotation of the cam or near to it.

17. In a power loom and in combination a thread cutter, a series of thread spools mounted transversely of the warp threads, means for automatically changing said series of spools as they become exhausted, a rotary device mounted transversely of the warp threads, and comprising means for drawing off and gripping a series of threads from the thread spools, means for holding said threads in the path of the cutter, which cuts them, means for moving said cut threads to the weaving point, means for inserting said threads into the fabric during the weaving, means for releasing said inserted threads and means for regulating the lengths of the threads drawn off from the spools before same are cut.

18. In a power loom and in combination, a slide guide mounted transversely of the warp threads, a cutting disc slidably mounted in said guide, a cutting bar co-operating with the cutting disc to sever a series of threads, means for rotating the cutting disc, means for moving the cutting disc in its guide and means for oscillating the cutting bar to and from the disc.

19. In a power loom and in combination, a series of threads spools, a rotary shaft mounted transversely of the warp threads, end plates on said shaft, two pairs of jaw members extending the full length of the rotary shaft between the end plates and mounted in said end plates, two sets of thread guiding and inserting members extending the full length of the rotary shaft between the end plates and mounted in said end plates, one set adjacent each pair of jaw members, means for intermittently rotating the shaft to move each pair of jaw members and each set of thread guiding and inserting members in turn to the weaving point, the jaw members carrying lengths of thread severed from the thread spools, and means for automatically operating the thread guiding and inserting members to insert the threads into the fabric at the weaving point during the process of weaving.

20. In a power loom and in combination, a series of thread spools, a rotary shaft mounted transversely of the warp threads, end plates on said shaft, two pairs of jaw members extending the full length of the rotary shaft between the end plates and mounted in said end plates, two sets of thread guiding and inserting members extending the full length of the rotary shaft between the end plates and mounted in said end plates, one set adjacent each pair of jaw members, one set of thread guiding and inserting members mounted in the loom frame transversely of the warp threads and adjacent the weaving point, means for intermittently moving the shaft to bring each pair of the jaw members and each set of thread guiding and inserting members to the weaving point in succession, means for causing each set of thread guiding and inserting members to co-operate at the weaving point with the set of thread guiding and inserting members on the loom frame to insert threads carried by the jaw members and severed from the thread spools into the fabric at the weaving point during the weaving process.

21. In a power loom and in combination, a series of thread spools, a rotary shaft mounted transversely of the warp threads, end plates on said shaft, two pairs of jaw members extending the full length of the rotary shaft between the end plates and mounted in said end plates, means for intermittently rotating said shaft, means for opening and closing each pair of jaw members automatically to grip a series of threads from the spools, carry said threads into the path of a cutter which cuts them, and then to carry said cut threads towards the weaving point, thread inserting means comprising two sets of rods mounted between the end plates, each set comprising an oscillating guide rod having two series of transverse thread guiding grooves in different planes and an oscillating inserting rod of hook shaped section having a series of teeth on its working edge spaced to co-operate with the sets of grooves in the guide rod and a further set of similar oscillating rods mounted on the loom frame transversely of the warp threads and adjacent the weaving point.

22. In a power loom and in combination, a series of thread spools, members adapted to grip a series of threads from the thread spools, means for causing said members to descend through a regulatable distance to draw off a longer or shorter series of threads, means for cutting the threads held in said members, means for giving a rotary movement to the members to carry them to the point where the threads are to be inserted in the fabric, means for inserting the threads into the fabric at any desired point during the weaving, and means for releasing them from the thread gripping members, substantially as described.

In testimony whereof we affix our signatures in presence of a witness.

EDOUARD LAMBERT.
RENÉ PERNIN.

Witness:
PAUL CONLOMB.